United States Patent [19]

Frisch et al.

[11] Patent Number: 4,777,617
[45] Date of Patent: Oct. 11, 1988

[54] METHOD FOR VERIFYING SPELLING OF COMPOUND WORDS

[75] Inventors: Rudolf A. Frisch, Teaneck, N.J.; Antonio Zamora, Chevy Chase, Md.

[73] Assignee: International Business Machines Corporation, Armonk, N.Y.

[21] Appl. No.: 25,041

[22] Filed: Mar. 12, 1987

[51] Int. Cl.[4] ............................................. G06F 15/40
[52] U.S. Cl. .................................. 364/900; 364/419; 364/300
[58] Field of Search ........ 364/419, 300, 200 MS File, 364/900 MS File; 400/63

[56] References Cited

U.S. PATENT DOCUMENTS

| | | | |
|---|---|---|---|
| 4,329,561 | 5/1982 | Convis et al. | 364/900 |
| 4,342,085 | 7/1982 | Glickman et al. | 364/200 |
| 4,355,371 | 10/1982 | Convis et al. | 364/900 |
| 4,456,969 | 6/1984 | Herzik et al. | 364/900 |
| 4,672,571 | 6/1987 | Bass et al. | 364/900 |
| 4,701,851 | 10/1987 | Bass et al. | 364/419 |
| 4,703,425 | 10/1987 | Muraki | 364/419 |

OTHER PUBLICATIONS

A. Zamora, "Control of Spelling Errors in Large Data Bases," *The Information Age in Perspective, Proceedings of the ASIS Annual Meeting*, vol. 15, pp. 364-367, 1978.
A. Zamora, "Automatic Detection and Correction of Spelling Errors in a Large Data Base," Journal of the American Society for Information Science, 31(1), pp. 51-57, 1980.
J. J. Pollock & A. Zamora, "Automatic Spelling Correction in Scientific and Scholarly Text," *Communications of the ACM*, 27(4), pp. 358-368, 1984.
J. L. Peterson, "Computer Programs for Detecting and Correcting Spelling Errors," *Communications of the ACM*, 23(12), pp. 676-697, 1980.
R. Lowarance & R. A. Wagner, "An Extension of the String-to-String Correction Problem," *Journal of the ACM*, 23(12), pp. 676-687, 1980.
H. Jappinen & M. Ylilammi, "Associative Model of Morphological Analysis: An Empirical Inquiry," *Computational Linguistics*, 12(4), pp. 257-727, 1986.
R. P. Botha, *Morphological Mechanisms; Lexicalist Analysis of Synthetic Compounding*, Language and Communication Library, vol. 7, Pergamon Press, Oxford, 1984, ISBN 0-08-031820-7.
T. N. Turba, "Checking for Spelling and Typographical Errors in Computer-Based Text," Sperry Univac Language Systems, pp. 51-60.

*Primary Examiner*—Thomas M. Heckler
*Attorney, Agent, or Firm*—John E. Hoel

[57] ABSTRACT

This invention describes a method for automatically verifying spelling of compound words in many natural languages such as German, Danish, Swedish, Norwegian, Dutch, Icelandic, Afrikaans, Swiss German, etc. The basic technology of looking up words in a dictionary is supplemented by the association of component flags with each word and by the application of powerful tree-scanning techniques that isolate the components of compound words and determine their correctness in isolation and in association with each other. The technique can be used in word processing systems to support spelling verification, to hyphenate text, and to unhyphenate text.

8 Claims, 3 Drawing Sheets

```
a)   IS omorphically
b)   ISO MORPH ically
c)   ISO MORPHIC ALL y
d)   ISO MORPHIC ALLY
e)   ISO MORPHICALLY
f)   ISOMORPH ically
g)   ISOMORPHIC ALL y
h)   ISOMORPHIC ALLY
```

FLOW DIAGRAM

TREE SCANNING EXAMPLE

METHOD FOR VERIFYING SPELLING OF COMPOUND WORDS

BACKGROUND OF THE INVENTION

1. Technical Field

The invention disclosed broadly relates to data processing and more particularly relates to linguistic applications in data processing.

2. Background Art

Text processing word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985 entitled "Multilingual Processing for Screen Image Build and Command Decode in a Word Processor, with Full Command, Message and Help Support," by K. W. Borgendale, et al., now U.S. Pat. No. 4,731,735. The figures and specification of the Borgendale, et al. patent application are incorporated herein by reference, as an example of a host system within which the subject invention herein can be applied.

Three techniques for verifying spelling of compound words have been used by word processing systems. One prior art technique contains all the compound words that the system was able to verify stored in a dictionary data base. Verification consists of checking the dictionary for a match. An obvious limitation of this technique is the enormous amount of storage required to obtain passable coverage. Comprehensive coverage is impossible, particularly in the Germanic languages, because word compounding is used so extensively that a dictionary of all meaningful compounds cannot be constructed.

A second prior art technique described in the copending patent application Ser. No. 664,184, filed Oct. 24, 1984, now U.S. Pat. No. 4,672,571, and assigned to the IBM Corporation, consists of parsing, or separating, the constituent words of the compound and then checking them against the words stored in the dictionary data base. This technique is the only practical way of obtaining adequate verification of compound words, but the approach is prone to problems such as false coordination of components and imprecise determination of the "joints" between the word components. In this technique, certain letter pairs which had a high probability of being the "joints" between components were used as clues for breaking the words and then verifying the parts against the dictionary. In terms of system performance, since any unrecognized word must be parsed before it can be marked as misspelled, the parser must have a large number of break points in order to verify correct compounds. Thus, the identification of incorrect words is slowed down and degrades the performance of the system. Also, since languages that use compound words have longer average word lengths than non-compounding languages, the wasted computer time to try all the combinations allowed by the list of "joint" letter pairs can be considerable. As mentioned above, this second parsing technique suffers from false coordination errors. That is, a misspelled word consisting of two correctly spelled components will be considered correct. For example, if the word "overtime" is misspelled as "evertime" the word would be considered correct by this technique since "ever" and "time" are both correctly spelled components. Similarly, run-on words such as "thatis" will be verified as "correct" compounds. Ambiguities in identifying the components of a compound can lead to incorrect hyphenation. For example, "snakeskin" may be interpreted as "snakes-kin."

A third prior art technique described in the copending patent application Ser. No. 664,183, filed Oct. 24, 1984, now U.S. Pat. No. 4,701,851, and assigned to the IBM Corporation, consists of parsing the components of a compound word and checking against a dictionary for compound flags associated with each word to see if the components are associated in a permissible sequence. This prevents words that can be purely prefixes such as "pseudo" from verifying either in isolation or in a position other than the beginning of the word. Six compound flags are used to categorize word components. The six types of flags are: (1) word is uncompoundable; (2) word can be used alone or in the front or middle; (3) word can be used alone or in any position; (4) word can be used alone or in the back of a compound; (5) word can be used at the front or middle of a compound; and (6) the word can be used only at the back of a compound. While this technique is better than either of the first two techniques, the approach is limited because the six flags are insufficient to describe all situations. False coordination can occur as in the second technique, and some words will fail to verify because the compound flags assigned to the component words in the dictionary inadequately describe their function when used in a compound. A further deficiency of the third technique which results in wasted computer time is the isolation of all the possible components and their compound flags in an initial stage, followed by a second stage where the compound flags are examined. The inefficiency of the technique results from the permutations of components that have to be considered even when some of the components have compound flags that will eventually result in an invalid combination. The mechanism used in this technique also makes it impossible to account for letter elisions used during compounding as in the German word "schiffahrt" which has to be decomposed into "schiff" and "fahrt" in order to verify properly.

The shortcomings of the prior art techniques have made it necessary to develop a more efficient algorithm and a comprehensive set of compound codes to handle agglutinative languages in computerized applications adequately.

OBJECTS OF THE INVENTION

It is therefore an object of the invention to provide an improved technique for verifying the spelling of compound words.

It is yet a further object of the invention to provide an improved technique for verifying the spelling of compound words, which also accounts for letter elisions.

It is still a further object of the invention to provide an improved technique for verifying the spelling of compound words which is more efficient and comprehensive in the handling of agglutinative languages, than has been available in the prior art.

SUMMARY OF THE INVENTION

These and other objects, features and advantages of the invention are achieved by the method for verifying spelling of compound words disclosed herein. This invention describes a method for automatically verifying spelling of compound words in many natural languages such as German, Danish, Swedish, Norwegian, Dutch, Icelandic, Afrikaans, Swiss German, etc. The basic technology of looking up words in a dictionary is supplemented by the association of component flags with each word and by the application of powerful tree-scanning techniques that isolate the components of compound words and determine their correctness in isolation and in association with each other. The technique can be used in word processing systems to support spelling verification, to hyphenate text, and to unhyphenate text.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figures 1, 2:
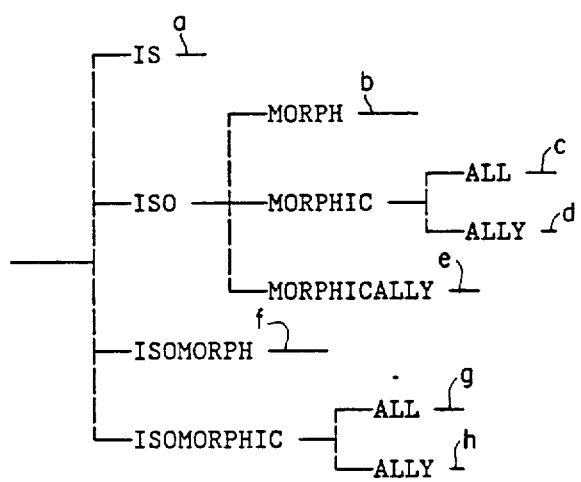
FIG. 1 illustrates an example of the various candidate substrings possible in the word "isomorphically."
FIG. 2 is a tree diagram of the analysis of the word "isomorphically" illustrated in FIG. 1.

The invention is a technique for parsing compound words by matching the input word against dictionary words to obtain those that match a portion of the input word and have appropriate compounding codes. When the input word does not match any dictionary word exactly, the process is repeated with the remaining portion of the input word until either a match is found and all the components have been identified, or all possibilities have been explored and none is satisfactory.

Two aspects of the invention are a comprehensive set of compound flags associated with each dictionary entry and an efficient method for examining the input word systematically. These two aspects are described in detail.

The Compound Flags

Linguistic and theoretical analysis of compound words has shown that each component may have any of four independent characteristics relative to compound formation: (1) it can occur as an isolated word, (2) it can be a front component or prefix, (3) it can be a middle component of a word, and (4) it can be a back component or suffix. These four characteristics can occur in any combination for a total of 15 possibilities, the case where none of the characteristics apply never being used. The word "sun," for example, might be tagged with characteristics 1 and 2 since it can occur as an isolated word or as a prefix in words like "sunglasses" or "suntan." The word "glasses," on the other hand, would have characteristics 1 and 4 since it can be used either isolated or as a suffix. A word like "pseudo" would be marked with characteristic 2 since it can only be a prefix. The word "intangible" would have characteristic 1 because it only occurs as an isolated word. For some German language examples, the combination of features 1+3+4 can be associated with the word "Sandale" which can occur alone or as a middle or back component of a word:

Example of word "Sandale" with features 1+3+4:

Leder+Sandale+Reparatur=Ledersandalereparatur

Example of word "ig" with features 3+4:

Kurz+Bein+ig+keit=Kurzbeinigkeit

Additional codes may be used to indicate the type of morphological transformation that a word can undergo.

The dictionary containing the compounding characteristics for each word can be generated either manually or automatically. The automatic process requires the decomposition of correct compound words into their components using the parsing algorithm given below while keeping track of the position of each component within the word. The segmented words can be reviewed manually to assure that no compounding codes for incorrectly segmented words are admitted into the dictionary.

The Parsing Algorithm

The parsing algorithm is a process for systematically exploring all possible word breaks efficiently. The algorithm is based on "preorder" scanning of trees. Although it is not obvious that this type of scanning is applicable to word parsing, the application is made possible by recognizing that the components of a compound word can be ordered so as to map "isomorphically" with a tree of variable depth.

Consider, for example, the word "isomorphically" as a compound word. If we examine this word for the substrings that can match against the dictionary we will find the words that are capitalized in FIG. 1.

The list of words in FIG. 1 can be represented as a tree of the form indicated in FIG. 2. The tree in FIG. 2 can be scanned in preorder sequence to examine all the possibilities that can be used for word formation. However, some branches of the tree can be eliminated from consideration at the outset since the words forming the branches will have inappropriate compound flags. For example, it is not even necessary to check beyond the word "IS" since it can only occur as an isolated word.

In practice, at each branching point in the tree, the dictionary is examined for all words starting with those particular letters to optimize dictionary access. The candidate words are considered by applying the algorithm recursively or by placing the words in a stack that is processed iteratively. Either of these two approaches will produce equivalent results.

A "stack," in computer terminology, is an array where information is stored in a prescribed sequence. Generally, the last item stored in the stack is the first one retrieved (analogous to a stack of coins on a table). The implementation of the invention with a stack requires that as the dictionary is scanned for substrings that match the word, the position and length of each matching dictionary word is stored in the stack. It is not necessary to save the matching dictionary word, since it is a substring of the compound word. When all suitable matches have been found (as determined by examination of the flags associated with the dictionary entries), the characters of the compound word not included in the last word added to the stack are matched against the dictionary again, and the process is repeated until a suitable match that encompasses all the remaining characters of the compound word are found. However, if no suitable matches are found, the unsuccessful words at the top of the stack are removed and another attempt is made with the next word in the stack. If the stack is empty before a suitable match is found, the process finishes without identifying any components.

If certain language-specific characteristics are present, morphological adaptation procedures are applied to analyze for elision of consonants (as for "schiffahrt") or to convert multiple letter combinations such as "ue" into a "u" with an umlaut depending on the requirements of the language. In a German hyphenated word like "zuk-ker" the removal of the hyphen also changes the spelling to "zucker."

A stack-based implementation of the algorithm is given below in a pseudo-code similar to PL/1:

TABLE I

TREE SCANNING PROCEDURE
FOR PARSING COMPOUND WORDS

```
/*                              GENERAL PARAMETERS                               */
DCL WORD                        CHAR(MXLENGTH);/* Word to be decompounded        */
DCL MXLENGTH                    FIXED BIN(15); /* Maximum word length            */
DCL WORDLEN                     FIXED BIN(15); /* Length of WORD                 */
DCL SWORD                       CHAR(MXLENGTH);/* Substring of word              */
/*                              STACK FOR BACKTRACKING                           */
DCL 1 STACK,
      2 TABNOMAX                FIXED BIN(15), /* Maximum no. of components      */
      2 TAGMAX                  FIXED BIN(15), /* Maximum no. of substrings for  */
                                /* a component level                             */
      2 TABNO                   FIXED BIN(15), /* No. of current component level */
      2 TABLE(TABNOMAX)
        3 POS                   FIXED BIN(15), /* Starting position of substring */
        3 NUM                   FIXED BIN(15), /* No. of substrings for current  */
                                /* level                                         */
        3 TAG                   FIXED BIN(15), /* Current substring number       */
        3 LEN(TAGMAX)           FIXED BIN(15), /* Length of substrings in word   */
/*                  PSEUDOCODE FOR DECOMPOUNDING                                 */
/*                                                                               */
      /* Set up first table entry (first level */
      TABNO = 1;
      TAG(TABNO) = 1;
      POS(TABNO) = 1;   /* Point to first character of WORD                      */
      SWORD = WORD;     /* Set SWORD equal to WORD                               */
FORWARD:
      /* Find the leading substrings of SWORD that exist in the                  */
      /* dictionaries. Store number of substrings found and the                  */
      /* length of each substring in the stack.                                  */
      CALL FIND_SUBSTRINGS(SWORD,STACK);
      /* If no substring is found, backup to the previous level                  */
      IF NUM(TABNO) = 0 THEN GOTO BACKWARD;                                      */
FLAG_CHECK:
      /* Examine the compound flag of the substring for validity                 */
      CALL FLAGCHECK(WORD,WORDLEN,STACK,FLAGRC);
      /* If the flag is valid (FLAGRC = 0), then check if the                    */
      /* substring exhausts the word. If it does, we have found                  */
      /* a valid compound word. If it does not then go to the next               */
      /* level and finding the next subword to be decompounded.                  */
      IF FLAGRC = 0 THEN DO;
      IF POS(TABNO) + LEN(TABNO,TAG) - 1 = WORDLEN
      THEN GOTO SUCCESS; /* Complete word OK                                     */
      POS(TABNO+1) = POS(TABNO) + /* Start of new substring                      */
      LEN(TABNO,TAG);
      TABNO = TABNO +1; /* Increment level                                       */
      /* SWORD contains remaining substring of the word.                         */
      SWORD = SUBSTR(WORD,POS(TABNO),WORDLEN)-POS(TABNO));
      TAG(TABNO) = 1; /* Set TAG=1                                               */
      GOTO FORWARD; /* Try new candidate                                         */
END;
/* If the flag is not valid (FLAGRC=1), then if there is                         */
/* another substring at this level, examine the flag for                         */
/* this substring. Otherwise, go back to the previous level                      */
/* after checking morphological possibilities.                                   */
IF TAG(TABNO) < NUM(TABNO) THEN DO; /* More substr.this level?                   */
TAG(TABNO) = TAG(TABNO) + 1; /* Next substr.this level                           */
GOTO FLAG_CHECK; /* Check its flag                                               */
END;
/* No more substrings at this level                                              */
/* Apply language-specific morphological procedures.                             */
CALL MORPH(WORD,WORDLEN,STACK);
BACKWARD:
      /* Calculate the previous level. If the resulting level is                 */
      /* zero, we have failed to find a valid word                               */
      TABNO = TABNO -1;
      IF TABNO = 0 THEN GOTO FAIL;
      /* If there is another substring at this level, try this                   */
      /* substring. Otherwise, go back to the previous level.                    */
      IF TAG(TABNO) < NUM(TABNO) THEN DO;
      TAG(TABNO) = TAG(TABNO) + 1;
```

TABLE I-continued
TREE SCANNING PROCEDURE
FOR PARSING COMPOUND WORDS

```
    GOTO FORWARD:
    END;
GOTO BACKWARD;
/* END OF TREE SCANNING PROCEDURE                          */
```

Letter Elisions

There are circumstances when letters are elided for linguistic reasons when two words are combined and the resulting compound word is not strictly a juxtaposition of the components. The invention is able to process these cases for certain general cases. In German, for example, a letter is elided when a word ending in a double consonant is combined with another word that starts with the same consonant. For example, the word "Schiffahrt" (German for "boat trip") is constructed from "Schiff" ("boat") and "Fahrt" ("trip") by eliding an "f." Therefore, as part of the morphological transformations performed by the invention, when no suitable dictionary entries can be found for the remainder of the word (in this case for "ahrt"), a check is made to see if the previous component ends in a double consonant and the next character a vowel. When these conditions are found, the starting character of the remaining string is set to last character of the previous word. In this way the program checks for the word "fahrt."

Letter Insertions

A case analogous to letter elisions is the case of letter insertions. In German this happens with the genitive case where the letter "s" is added to the initial component. The invention handles this problem by checking to see if the remaining component starts with "s" whenever no suitable match can be found. If an "s" is present, it is skipped and a match is attempted on the remaining portion of the compound word.

Capitalization

Just as English requires proper nouns and adjectives derived from them to be capitalized (e.g., American), so German grammar requires that all nouns be capitalized. Thus, a German dictionary contains many words starting with upper case. This presents a problem when matching a compound word, since only its first character may be capitalized and any internal components will start in lower case. This is solved by the invention by ordering the dictionary in alphabetical order without regard to case (but indicating case as an additional attribute) and by converting the dictionary words and the compound word to a common character set at the time of matching.

Specific Morphological Transformation

In addition to the features that characterize the usage of a component in a compound word, codes specifying specific transformations can be associated with each word in the dictionary. For example, the Afrikaans language has a large number of words for which the combining non-back form of the genitive singular has the same spelling as the nominative plural, both adding "s" to the nominative singular. When such a word is compounded with a word starting with "s," one of them must be elided. This can be indicated by associating a special code with such words. For example, such a code associated with the word "mans" would result in elision of an "s" when combined with "skool:" mans + skool =- manskool. Such specific transformations are represented by codes in the dictionary and enable the decomposition of the compound word into its components. Notice that this technique relies on the specific encoding of the attribute within the dictionary rather than as a part of the algorithm as indicated for elisions above.

Support of Hyphenation

One of the by-products of compound word analysis as described in this invention is the state of the stack after a compound has been processed. The stack contains the information that identifies the components of the compound, and hence, the major hyphenation points of the compound. These hyphenation points may be supplemented by hyphenation information stored for each component. In addition, the fact that the invention identifies letter elisions makes it possible to hyphenate correctly such words. For example, the German word "Schiffahrt" would be correctly hyphenated as "Schiff-fahrt" by restoring the elided letter.

Figure 3:
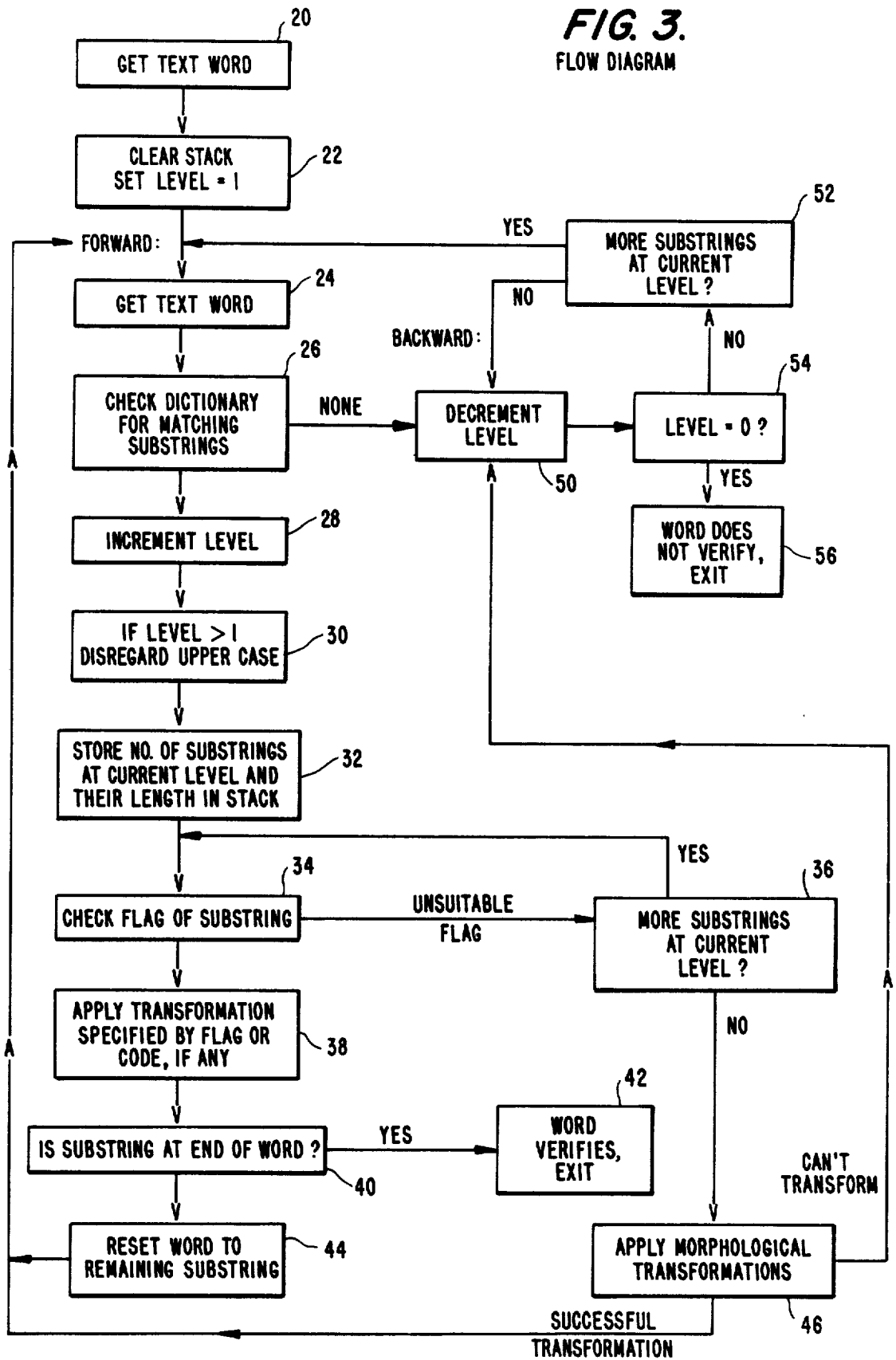
FIG. 3 is a flow diagram of the invention.
Figure 4:
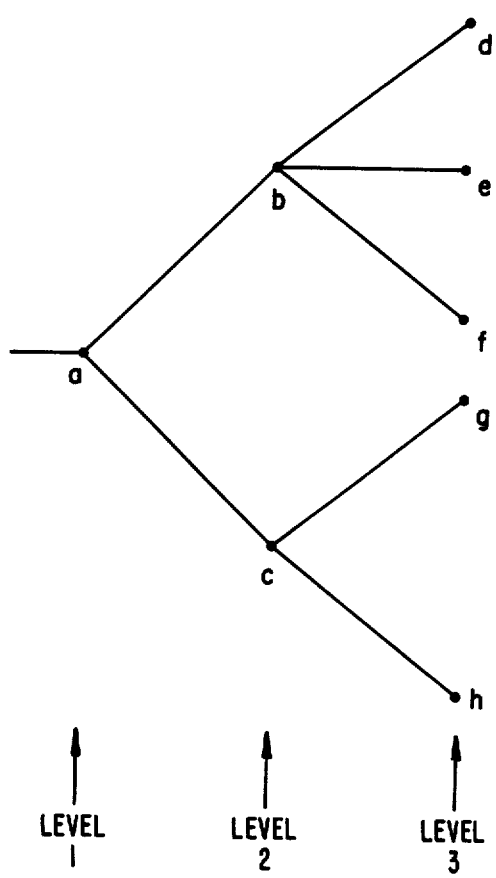
FIG. 4 is an example of tree scanning.

The flow diagram of FIG. 3 is implemented with a stack. Step 20 says to get the text word. This is a either text from an input buffer or it can be supplied by another computer program. In Step 22, we clear the stack. That means we set the stack to empty and we set the level equal to one. The procedure by which we scan the stack is basically a pre-order form and that means that you set a chain as in FIG. 4, starting with the node "a" which splits off into nodes "b" and "c." The nodes "b" and "c" are at the level 2 and then if "b" splits into nodes "d," "e" and "f," this is the third level. If node "c" splits into nodes "g" and "h," again this is the third level. The tree would be scanned by going from "a" to "b" to "d," then "e," then "f," back to "b," back to "a" and then to "c" to "g" and then "h," back to "c" and back to "a." That would terminate the scan of the tree. The disclosed invention does the equivalent function for trying the various possibilities of finding substrings within a word for verification. We now proceed to the label "Forward." At this point, we get the text word in Step 24; in this case, there is no change in the text word because it has not been altered. It is the same as that which was originally input. In subsequent looping through the flow chart, it would be a modified version of the word. Then we proceed to Step 26 labeled "Check dictionary for matching substrings." At this stage, we check the dictionary and any dictionary entries which match exactly against the initial portion of the string are identified. If none of the words match, we go to the label "Backward" where we are going to decrement the levels and try other possibilities by going to other branches of the chain. But if there are some matching entries, then this creates a new level, so we increment the level in Step 28. In order to account for upper case, we have to check if the level is greater than one in Step 30. That means it is not an initial substring of the word, and we disregard the upper case that may be in the word stored in the dictionary. At this point, we come to Step 32 labeled "Store number of substrings at current level in their length in stack." Basically this is just a mechanism for storing the strings for future reference. It is storing the place where the string starts and its length for the current level. By having stored this information, we proceed to check the flag of the substrings in Step 32. If we find an unsuitable flag, then we go to Step 36 marked "More substrings at the current level." We continue checking those substrings until we either do not find any substrings at the current level or until we find a substring with a suitable flag. When we find the substring with the suitable flag, we proceed to Step 38 "Apply transformation specified by flag or code, if any." In this step, transformations requiring additions of letters are performed. After these transformations are applied, then we check to see if the substring is at the end of the word in Step 40. If it is, then we can say that the word verified because all the components have been checked and they have appropriate flags, so at this point, we exit at Step 42. However, if the substring is not at the end of the word, now we remove from the word that initial substring in Step 44 and keep the remainder (the right part) of the substring and then go back to the label "Go forward" to repeat the process with the remaining substring. In this way, each segment of the word is iteratively processed until the whole word has been recognized. In Step 46 labeled "Apply morphological transformations," whenever there are no more substrings at the current level, the operator must take into consideration whether there were any transformations applied between the words. At this point, those transformations are applied. If the transformation is successful, again we go to the label "Forward," continue processing the string. If we cannot transform it, then we go back to the label "Backward." "Backward" is really the process of recovering from a failure along the branch and if we can explore the branch of a tree which does not lead to a complete recognition of the word, then we decrement the level in Step 50 after we have tried all the possibilities at that level (Step 52). If the level is zero in Step 54, then we know that the word does not verify (Step 56) because we have tried all the possibilities. If the level is not zero and there are more substrings at the current level, we continue with "Forward" until we exhaust all the possibilities.

Although a specific embodiment of the invention has been disclosed, it will be understood by those of skill in the art that changes can be made to the invention without departing from the spirit and the scope of the invention.

What is claimed is:

1. A computer method for parsing a compound word composed of a plurality of word components, comprising the steps of:

storing a dictionary of stored word components and associating with each of said components a flag indicating whether said word component can be an independent word, a prefix of a word, a middle element of a word, a suffix, or a code specifying the type of morphological transformation it can undergo;

inputting an input word stream which includes a compound word which is to be parsed;

selecting all words from the dictionary that match an initial substring of the input word and retaining only the dictionary words which have a component flag indicating that said dictionary word can be a prefix element;

processing all the remaining portions of the input word, selecting all words from the dictionary that match an initial substring of said remaining portion of the input word and retaining only the dictionary words which have a component flag indicating that the word can be a middle element of a word;

processing all the remaining portions of the input word, selecting all words from the dictionary that exactly match said remaining portion of the input word and retaining only the dictionary words which have a component flag indicating that the word can be a word suffix element;

applying morphological rules during the search for middle or suffix elements if no suitable dictionary candidates can be found.

2. The process as stated in claim 1 where only prefix and suffix elements are considered.

3. The process as stated in claim 1 where the search for matches against the dictionary is controlled by a tree-scanning procedure implemented with a stack.

4. The process as stated in claim 1 where the morphological rule applied during the search for middle and suffix elements consists of identifying whether the remaining portion of the input word under consideration starts with a vowel and the preceding element ends in a double consonant, in which case a copy of said consonant is inserted ahead of said vowel.

5. The process as stated in claim 1 where the morphological rule applied during the search for middle and suffix elements consists of identifying whether the remaining portion of the input word under consideration starts with the letter "S," in which case said letter is removed.

6. The process as stated in claim 1 where the morphological rule applied during the search for middle or suffix elements consists of identifying whether the dictionary term is capitalized, in which case the initial letter of said dictionary term is made lower case.

7. The process as stated in claim 1 where the morphological rule applied during the search for middle or suffix elements consists of a morphological transformation specified by the code associated in the dictionary with the preceding element.

8. The process as stated in claim 1 where the components identified by said process are stored as reference to provide hyphenation points for the input compound word.

* * * * *